Aug. 23, 1949.        E. K. WAGNER         2,479,881
                      ELECTRONIC CONTROL
Filed Dec. 22, 1945                    2 Sheets-Sheet 1

INVENTOR
Elmer K. Wagner
BY
ATTORNEYS

Aug. 23, 1949.	E. K. WAGNER	2,479,881
ELECTRONIC CONTROL
Filed Dec. 22, 1945	2 Sheets-Sheet 2

INVENTOR
Elmer K. Wagner
BY
ATTORNEYS

Patented Aug. 23, 1949

2,479,881

UNITED STATES PATENT OFFICE 2,479,881

ELECTRONIC CONTROL

Elmer K. Wagner, Fond du Lac, Wis., assignor to Giddings & Lewis Machine Tool Co., Fond du Lac, Wis., a corporation of Wisconsin Application December 22, 1945, Serial No. 636,926

24 Claims. (Cl. 171—97)

The present invention pertains to electronic control means for energizing a load circuit in response to a predetermined input voltage. More particularly it relates to means for selectively energizing a plurality of loads using a number of control station conductors which is small compared to the number of loads controlled.

In the field of industrial control it is frequently necessary to control the operation of a plurality of operators from a remote control point. To accomplish this it is commonly necessary to use a control cable having a control conductor for each one of the loads controlled. Where the number of functions or loads to be controlled is large, which is frequently the case in modern control applications, the control cable and station becomes sufficiently large and heavy to adversely affect portability.

This problem is particularly serious in the field of machine tools wherein it is necessary to control direction of rotation, inching, direction of feed, rapid traverse, and speed of rotation. It is often necessary for the above functions, among others, to be controllable separately for the spindle of the machine, the head stock, and the column. Control of such functions from a remote point has in many instances required a control cable having 70 or more conductors. The size of many types of machine tools requires that the control cable be of an appreciable length and the resultant necessity for protecting the cable against abrasion has made it necessary to use an outer protective sheath further increasing the size and weight of the cable. Since it is necessary for the conductors in the usual application to carry relay or controller current, each conductor in the bundle must be of appreciable cross section. The control stations have also been heavy and difficult to transport because of the size of switches required to carry relay and controller current and because of the large cable entry and clamping means required. Because of the weight of the cable and control station a control stand or pedestal has been employed, but the use of such supporting means further decreases the flexibility of remote control, making it impossible to carry the control station upon or into a large casting to perform a delicate machining operation.

The disadvantages of control methods now used have also been felt in other, allied fields, for example, in the control of large hoists and the like.

Generally stated, it is an object of this invention to provide remote control apparatus for selectively energizing a series of loads simply by varying the potential on a control line.

More particularly means have been provided whereby application of a predetermined control potential may cause a single load to be selected and operated to the exclusion of the remainder of the loads in the system.

The invention when employed for the remote control of a machine tool or the like is characterized by the use of a light flexible cable having a greatly reduced number of conductors and a light, easily portable control station. Further, a mode of control has been provided which allows the length of the control cable to be as great as desired and the conductors to be of small cross section since potential and not current is used as the controlling condition. In addition the apparatus used is particularly adapted to cause energization of a series of functions in a desired pre-set sequence required in the controlling of a large machine tool such as a precision horizontal boring, drilling and milling machine. The control apparatus which I disclose eliminates the necessity for conventional relay circuits and the attendant contact problems and maintenance.

It is an object of the invention to provide a controlling means which is simple to operate and which will perform the desired control functions with a minimum of care and attention on the part of the operator.

It is another object of my invention to provide remote controlling means which is inherently safe for the operating personnel. It is particularly suitable for use with low control potentials, and the control conductors need not carry measurable amounts of electrical power. It is an object closely allied with the above to provide a control system admitting of the use of a small self-contained battery power supply.

It is a further object of the invention to provide a system incorporating means for circuit maintenance without the use of latching type control relays and the like. Correlative to the above it is an object of this invention to provide an improved method for the interlocked deenergization of one load upon the energization of a second load.

A still further object of the invention is to provide a controlling means which is inexpensive to construct and maintain and which uses readily available low cost electronic components.

It is another object of the invention to provide electronic control means readily adapted if desired to provide for simultaneous energization of loads respectively controlled by two or more adjacent control tubes.

It is still another object of my invention to accomplish the control of a multiplicity of functions by receipt of a single short voltage impulse without the use of ratcheting relays, electromagnetic stepping devices or the like.

Further objects and advantages of the invention will become apparent as the following description proceeds taken in connection with the accompanying drawings, in which.

While the invention is susceptible of various modifications and alternative constructions, I have shown in the drawings and will herein describe in detail the preferred embodiments; but it is to be understood that I do not thereby intend to limit the invention to the specific form disclosed, but intend to cover all modifications and alternative constructions falling within the spirit and scope of the invention as expressed in the appended claims.

In the instant exemplification the invention has been shown embodied in a control system particularly adapted to the controlling of a machine tool although it will be apparent as the discussion proceeds that the constructions illustrated are also suitable for many other control purposes. Prior to a discussion of the specific circuits employed it is helpful to consider the problem of selective energization of a load in its simpler aspects and by the addition and combination of elements lead to the specific and more complex circuits to be described herein.

It is well known that an electron tube, which also may be termed a valve or discharge device, having a load energized by flow of plate current can be caused to be conducting or nonconducting by controlling the grid bias. For example, the load can be deenergized by providing a source of fixed negative grid bias beyond cut-off, that is, by providing a potential on the grid which is sufficiently negative with respect to the cathode to prevent plate current flow. If it is desired to energize the associated load, it is possible to apply additional bias to make the grid less negative or if desired to cause the grid to become more positive than the cathode for producing a large magnitude of plate current flow.

Figure 1:
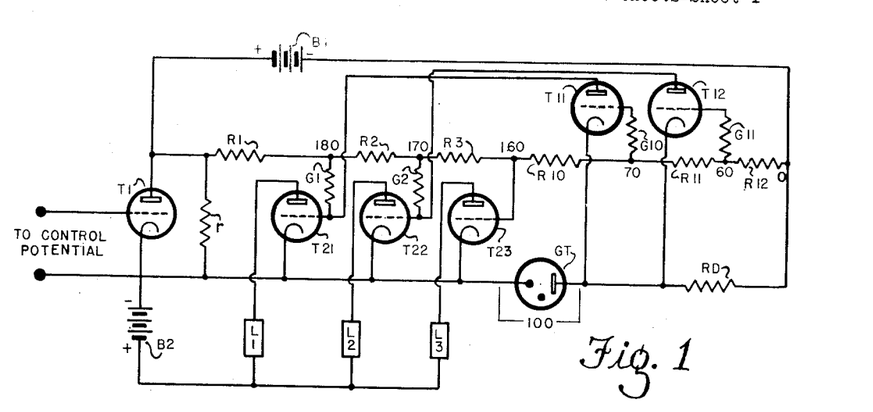
Figure 1 is a simplified diagrammatic representation of one embodiment of my invention set forth primarily to illustrate the mode of operation.

Referring more particularly to the simplified arrangement shown in Fig. 1, three loads have been indicated at $L_1$, $L_2$ and $L_3$. The purpose of the circuit shown is to select one of these loads to which current is to be fed simply by applying to the input leads a corresponding value of potential from a suitable variable direct voltage source. Since a mere change in input potential is required to effect selection of the loads, and since only two input or control leads are employed, the primary control voltage source may be located remotely and may be readily portable with a two conductor line connecting it to the cabinet or the like in which the remainder of the controls are housed.

Energization of the loads $L_1$, $L_2$ and $L_3$ is, in Fig. 1, accomplished through a corresponding set of load tubes by utilizing the control line voltage to vary the grid bias on the load tubes. However, unless otherwise provided for, control of the load tubes would accomplish consecutive but not selective or individual load energization. It is to effect such selective operation that additional or control tubes have been associated in a novel manner with the load tubes. In Fig. 1 the load tubes are designated $T_{21}$, $T_{22}$ and $T_{23}$. These tubes may be type 6L6G or the like of sufficient rating to pass the necessary current to energize the loads. In the plate circuits of the control tubes, loads are provided which are respectively designated $L_1$, $L_2$ and $L_3$. The control tubes $T_{11}$ and $T_{12}$ have plates respectively connected to the grids of the load tubes $T_{21}$ and $T_{22}$. In order to provide "stepped" or incremental voltages to the grids of the load and control tubes, a tapped voltage divider is used which consists of sections $R_1$, $R_2$, $R_3$, $R_{10}$, $R_{11}$ and $R_{12}$ placed across a direct current source $B_1$. The potentials at the resistor taps are indicated and the method for determining the potentials to be used will be discussed below.

In order that the flow of current through a control tube may make the associated load tube nonconducting, plate voltage dropping resistors $G_1$ and $G_2$ are provided between the tube elements and the voltage divider. Current flow through these dropping resistors is utilized to cause a voltage drop sufficient to cause the grid potential on a given load tube to reach a cut-off value in spite of the fact that other circuit voltages if acting alone may be such as to render the tube conducting.

In order to produce selective operation of the circuit thus far described, it is desirable for two conditions to be satisfied. First, the negative bias of each load tube should be lower than the bias on the associated control tube thereby producing a bias differential between associated tubes. Secondly, a difference in bias between two adjacent load tubes should be sufficiently great to prevent two load tubes from operating simultaneously. The first condition insures that as the negative bias on a load tube and its associated control tube is reduced in magnitude, the load tube will become conducting and a further reduction will cause the control tube to become conducting thereby deenergizing the associated load tube. In the discussion which follows it will be assumed that tubes are used which conduct heavily at zero grid bias and are completely nonconducting by the time that a grid bias of minus 10 volts is reached. It has been found that biasing the control tubes 10 volts more negatively than the load tubes enables satisfactory energization and deenergization of the load. The value of the bias differential will, however, depend upon the characteristics of the tubes used. It is desirable however that the bias differential between a control tube and its associated load tube be equal or greater in magnitude than the swing in bias voltage required to change the load tube from a nonconducting condition to a condition of rated current flow.

It has been stated immediately above that a 10-volt bias differential is desirable. However, it will be noted that the grids of the load tubes are connected to the highly positive end of the tapped voltage dividing resistor while the grids of the control tubes are connected to the negative end. In the embodiment illustrated in Fig. 1 the voltage of the grid of the load tube $T_{21}$ is at a potential of plus 180 volts while the grid of the associated control tube $T_{11}$ is at a potential of plus 70 volts. The actual voltages on the grids of the first load tube and first control tube respectively need not be the values given; it is merely necessary that a difference in magnitude of that general order exist where tubes of ordinary commercial types of a number between three and approximately nine are to be used for control tubes. In order to compensate for this large differential in the voltage applied to the grids of associated tubes, it is necessary to introduce a voltage dropping or voltage compensating device to cause a voltage difference to exist between the cathodes of the control tubes and the cathodes of the load tubes. Because of its constant voltage drop characteristics it has been found desirable to use a glow tube GT. Assuming that grid voltages of 180 and 70 mentioned above are used, and merely for the purpose of illustrating the method used in the detail design of a circuit of the type disclosed, a gaseous glow tube should be chosen which will make the net difference in bias between a load tube and its associated control tube 10 volts. This condition is satisfied in the circuit shown by using a commercial glow tube which has a fixed 100 volt voltage drop regardless of the current flow through it. After insertion of the glow tube into the circuit, and assuming that the grids of the load tubes and control tubes are spaced along the voltage divider at equal increments of voltage, it will be noted that control tube $T_{21}$ is biased 10 volts less negatively than $T_{11}$, that $T_{22}$ is biased 10 volts less negatively than $T_{12}$. This relationship is also true where more than three load tubes are used as, for example, in the circuit of Fig. 2.

As a second desirable condition, referred to above, for selective operation of the loads it is desirable that the incremental voltage between grids of adjacent load tubes exceed the bias differential between a load tube and its associated control tube. This relationship is desirable in order that only one load may be energized at a time. It is possible, however, as will be described in detail later in the discussion, to cause the bias differential between the load tube and a control tube to exceed the incremental voltage differential between the grids of adjacent tubes to produce simultaneous energization of the loads associated with two adjacent control tubes or, if desired, even three or more. It will be recognized, however, that the latter arrangement may be used for special purposes and is not normally encountered in machine tool control practice.

It is desirable to use a voltage divider which has a sufficiently low total and intertap resistance that the voltages existing at the taps remain substantially unchanged in spite of the flow of plate current into the tapped resistor from the control tubes. For example, it will be noted that the voltage desired at the tap between resistor sections $R_1$ and $R_2$ is 180 volts. The resistance of section $R_1$ should be sufficiently low so that the plate current of control tube $T_{11}$ on flowing through section $R_1$ does not cause the voltage at the tap to vary markedly from 180 volts. This precaution is particularly important since under certain conditions the plate currents of all control tubes must simultaneously flow through resistor $R_1$.

The use of a glow tube GT rather than a voltage-dropping resistor requires that a resistor $r$ be used to provide a path for the ignition current even though the input tube may not be conducting. The resistance of resistor $r$ may be high thereby having little effect on the remainder of the circuit since the current to sustain a discharge through the glow tube under no-load conditions is extremely small.

While a standard glow tube having a voltage drop rating of 100 volts was found to be satisfactory in the embodiment shown in Fig. 1 it is possible to substitute glow tubes of other rated voltages if other appropriate changes are made in the circuit. For example, if it is desired to use a glow tube having a voltage drop rating of 90 volts instead of 100 volts the change may be accomplished by adjusting the resistance of section $R_{10}$ so that a 10 volt higher positive potential is supplied to the grid of each control tube from the tapped voltage source.

As a design consideration involved in a circuit of Fig. 1 and also in the circuits yet to be discussed, it is necessary that the potentials applied to the grids of the load tubes be sufficiently high so that appreciable current may flow in the plate circuit of the associated control tube. It is necessary, for example, that the voltage applied to the grid of load tube $T_{21}$ be sufficiently high so that the voltage drop through the resistor $G_1$ caused by the flow of plate current through tube $T_{11}$ may be sufficient to cause the grid voltage of the load tube $T_{21}$ to swing sufficiently negative to result in the cutting off of plate current flow in the latter tube. This condition is normally met by applying voltages on the order of 120 to 200 volts to the grids of the load tubes depending upon the plate current-grid voltage characteristic of the control tubes used.

It will be noted that grid resistors $G_{10}$ and $G_{11}$ are inserted into the grid circuits of control tubes $T_{11}$ and $T_{12}$. This is a precautionary measure to reduce the flow of grid current in the control tubes when the grid is caused to assume a positive potential with respect to the cathode.

Variable bias to control the selective energization of the load tubes may be provided by superimposing a variable control voltage to vary simultaneously the voltages on the cathodes of the load and control tubes directly from the control line. However, I prefer to control the voltage on the cathodes by means of a voltage dropping resistor RD. In order to vary the voltage drop through such dropping resistor, means are provided for varying the current through the dropping resistor, accomplished in my preferred embodiment by putting a vacuum tube $T_1$ in series with the dropping resistor so that the plate current of the tube passes through the dropping resistor. The amount of current through the input tube is varied by controlling the grid voltage of the tube. The variable grid voltage may be supplied from a control station located at a remote point. Since the grid of the input tube $T_1$ draws practically no current, it is merely necessary that it be furnished with an adjustable source of control potential. By a proper choice of input tube characteristics it is possible by this means to control current over a wide range merely by varying the grid voltage of the input tube from cut-off to a grid voltage which allows passage of the desired maximum plate current through resistor RD. Normally this plate current swing can be accomplished by using a relatively small range of applied grid voltage.

The operation of the circuit using an input tube connected as shown is as follows:

Assume first that the applied grid voltage is such as to cause the plate current through the input tube to attain a value producing a voltage drop in RD equal to 80 volts. Under such conditions the cathode voltage of the control tubes will be 80 volts positive while the cathode voltage of the load tubes will be 180 volts positive. Since we have assumed that the tubes are such as to be cut off when the grid bias is 10 volts negative, it will be seen that tubes $T_{22}$, $T_{23}$, $T_{11}$ and $T_{12}$ subject to the grid voltages indicated will be "cut off" since their grid bias is 10 volts or more negative. Tube $T_{21}$, however, having zero bias under the conditions named, will conduct thereby energizing the load $L_1$.

In order to clearly bring out the operation of the control tubes it will next be assumed that an input signal is applied to the input tube sufficient to cause the voltage drop through resistor RD to be 70 volts thereby applying a voltage which is 70 volts positive to the control tube cathodes and a voltage which is 170 volts positive to the load tube cathodes. Under these conditions tubes $T_{23}$ and $T_{12}$ will be cut off. Tube $T_{11}$ will have a zero bias and will, therefore, be conducting, the plate current of $T_{11}$ flowing through the resistor $G_1$. The load tube $T_{21}$ because of the negative grid bias produced by the voltage drop through the resistor $G_1$ will be cut off thereby deenergizing the load $L_1$. The remaining tube $T_{22}$ having a zero grid bias under the conditions named will be conducting thereby energizing load $L_2$. Thus it is seen that a small change in the grid bias of the input tube may cause a 10-volt change in cathode potential which in turn causes the deenergization of one load and the energization of a load connected to an adjacent load tube. A further change in the input voltage and, therefore, of the grid bias of the load and control tubes, may be utilized to cause load $L_3$ to be energized and load $L_2$ to be deenergized. Selective energization of loads by a change in input voltage has, therefore, been accomplished.

While the dropping resistor RD has been shown connected to the negative side of the battery $B_1$ and the input tube $T_1$ has been shown connected to the positive side, it is also possible, and in some applications desirable, to reverse the positions of the dropping resistor and input tube. This will have the effect of causing the cathodes to be at a maximum positive potential with no current flowing in the plate circuit of the input tube rather than at a maximum positive potential with full current flowing as shown in the circuit illustrated in Fig. 1.

Figure 2:
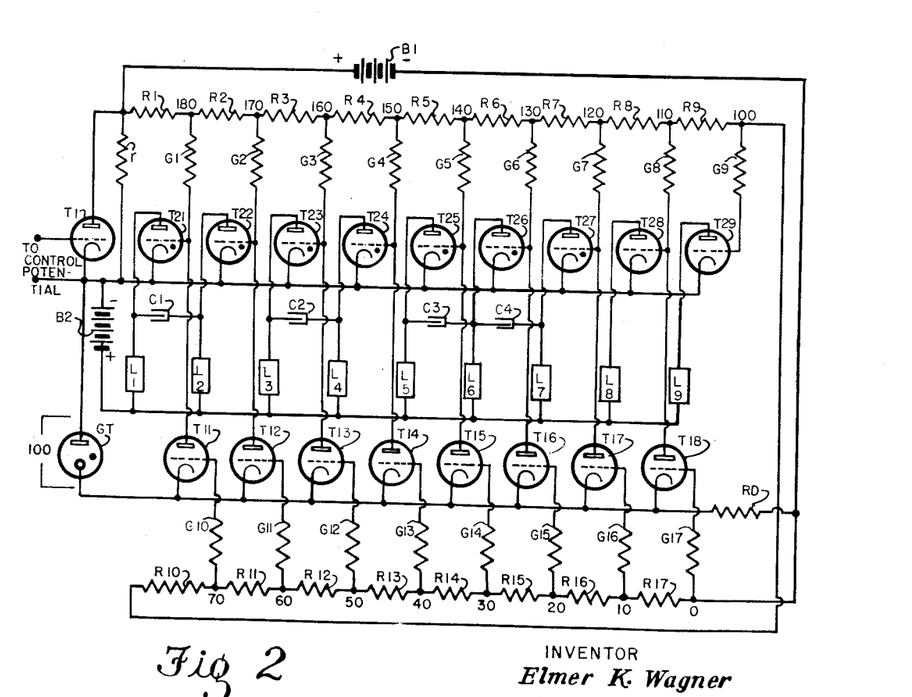
Fig. 2 is another embodiment of my invention in which control of nine separate functions is accomplished with two control conductors.

The embodiment shown in Fig. 2 differs from that shown in Fig. 1 primarily in the use of additional load and control tubes, in the use of gaseous conduction load tubes, and in the use of condenser means to deenergize one load tube upon energization of an associated load tube. The circuit as shown has provision for the control of nine separate loads, $L_1$ through $L_9$ which may, for example, be selectively controlled by the use of a control station of the type illustrated in Fig. 3.

Voltage for energizing the grids of both banks of tubes and the plates of the control tubes is supplied from the taps of the resistor consisting of resistors $R_1$ through $R_{17}$. The load tubes are designated respectively $T_{21}$ through $T_{29}$, $T_{28}$ and $T_{29}$ being of the vacuum type while the remainder of the control tubes may be of the gaseous conduction type. The control tubes are designated $T_{11}$ through $T_{18}$ and are supplied through the load tube grid resistors $G_1$ through $G_9$. Grid resistors $G_{10}$ through $G_{17}$ are used to limit the flow of grid current in the control tubes under conditions of positive grid bias.

The filament circuit of the tubes has been eliminated in order to simplify the diagram; however, it is desirable to supply the filament power to the load and control tubes from separate windings in view of the fact that the cathode voltage of the two banks of tubes differs by 100 volts. As in the previous embodiment a fixed voltage drop of 100 volts is obtained by means of the gaseous discharge of glow tube GT. A dropping resistor RD is also utilized in a manner similar to that described in connection with Fig. 1.

In order to simplify the explanation of the operation let it be assumed that both the load tubes and the control tubes are of the same type described in connection with Fig. 1, in other words, that all the tubes are of the vacuum type which may be biased to cut off by application of a 10-volt negative grid bias. If an input voltage is applied to the grid of tube $T_1$, at the input terminals shown, sufficient to cause a voltage drop of 90 volts through RD, it will be seen that all load tubes and control tubes will be biased 10 volts or more negatively and thus no current will flow in the plate circuit of any tube. By changing the input to produce a voltage drop through resistor RD of 80 volts, tube $T_{21}$ alone will become conducting thereby energizing load $L_1$. A further decrease in the voltage drop through resistor RD will cause the remainder of the loads to be successively and exclusively energized. In order to facilitate understanding of the circuit operation with voltage drops in resistor RD ranging from zero to 90 volts, the following table has been compiled in which the grid bias for each tube and the state of conductivity is tabulated for the various values of cathode voltage.

*Example*

| Input Tube Grid Voltage | Load Tube Cathode Voltage | Control Tube Cathode Voltage | Grid Bias Voltage on Each Tube Underlining Indicates Plate Current Flow. | | | | | | | | | | | | | | | | |
|---|---|---|---|---|---|---|---|---|---|---|---|---|---|---|---|---|---|---|---|
| | | | Load Tubes | | | | | | | | | Control Tubes | | | | | | | |
| | | | $T_{21}$ | $T_{22}$ | $T_{23}$ | $T_{24}$ | $T_{25}$ | $T_{26}$ | $T_{27}$ | $T_{28}$ | $T_{29}$ | $T_{11}$ | $T_{12}$ | $T_{13}$ | $T_{14}$ | $T_{15}$ | $T_{16}$ | $T_{17}$ | $T_{18}$ |
| 0 | 190 | 90 | −10 | −20 | −30 | −40 | −50 | −60 | −70 | −80 | −90 | −20 | −30 | −40 | −50 | −60 | −70 | −80 | −90 |
| $e_1$ | 180 | 80 | 0 | −10 | −20 | −30 | −40 | −50 | −60 | −70 | −80 | −10 | −20 | −30 | −40 | −50 | −60 | −70 | −80 |
| $e_2$ | 170 | 70 | x | 0 | −10 | −20 | −30 | −40 | −50 | −60 | −70 | 0 | −10 | −20 | −30 | −40 | −50 | −60 | −70 |
| $e_3$ | 160 | 60 | x | x | 0 | −10 | −20 | −30 | −40 | −50 | −60 | 10 | 0 | −10 | −20 | −30 | −40 | −50 | −60 |
| $e_4$ | 150 | 50 | x | x | x | 0 | −10 | −20 | −30 | −40 | −50 | 20 | 10 | 0 | −10 | −20 | −30 | −40 | −50 |
| $e_5$ | 140 | 40 | x | x | x | x | 0 | −10 | −20 | −30 | −40 | 30 | 20 | 10 | 0 | −10 | −20 | −30 | −40 |
| $e_6$ | 130 | 30 | x | x | x | x | x | 0 | −10 | −20 | −30 | 40 | 30 | 20 | 10 | 0 | −10 | −20 | −30 |
| $e_7$ | 120 | 20 | x | x | x | x | x | x | 0 | −10 | −20 | 50 | 40 | 30 | 20 | 10 | 0 | −10 | −20 |
| $e_8$ | 110 | 10 | x | x | x | x | x | x | x | 0 | −10 | 60 | 50 | 40 | 30 | 20 | 10 | 0 | −10 |
| $e_9$ | 100 | 0 | x | x | x | x | x | x | x | x | 0 | 70 | 60 | 50 | 40 | 30 | 20 | 10 | 0 |

LEGEND.—Underlining indicates plate current flow. x indicates bias has been increased to cut-off by current flow in control tube.

It will be seen from the table that the load tubes conduct only under conditions of zero grid bias. Under conditions when the grid bias of a given load tube would tend to have a more positive value, conduction in the load tube is prevented by plate current flow in the control tube.

The operation of the circuit of Fig. 2 when gaseous conduction tubes are used is somewhat different from that just discussed in that some external means must be provided for restoring a previously selected tube to a nonconducting condition. The grid of the tube is ineffective to accomplish this since, in a gaseous tube, once plate current flow takes place, increased negative grid bias on the tube cannot cause it to become nonconducting. The use of a gaseous type load tube, for example the type 2050 Thyratron, is desirable in many applications requiring that a load tube once energized remain conducting. The use of gaseous tubes has the advantage that latching relays are unnecessary and further that plate current flow is either zero or a maximum with no intermediate values. In addition, because of the low voltage drop through a gaseous tube, such tubes are enabled to carry greater current for a given power dissipation than vacuum tubes.

Condensers $C_1$ through $C_4$ are provided for automatically restoring the associated tubes to a nonconducting state. The use of such condensers will be made clear by a consideration of condenser $C_1$ and the load tubes $T_{21}$ and $T_{22}$. Assuming that load tube $T_{21}$ is energized and that no current is flowing through the plate circuit of $T_{22}$, the left-hand side of the condenser $C_1$ as shown in Fig. 2 of the drawings will become negatively charged with respect to the right-hand side. Subsequent energization of tube $T_{22}$ will cause the voltage on the right-hand side of the condenser to drop. Since the voltage across a condenser cannot change instantaneously, energization of load tube $T_{22}$ will cause the plate of load tube $T_{21}$ instantaneously to assume a value which is below the point of ignition, and conduction through the load tube $T_{21}$ will cease. Thus it is seen that tubes $T_{21}$ or $T_{22}$ may be energized alternatively but the two tubes may not conduct at the same time. Such alternative conduction also exists between tubes $T_{23}$ and $T_{24}$ by means of condenser $C_2$ and between tubes $T_{25}$, $T_{26}$ and $T_{27}$ through the action of condensers $C_3$ and $C_4$. Since machine tool functions are frequently alternative in nature, the exclusive energization of alternative loads provided in the circuit disclosed is particularly advantageous. A control station particularly adapted for the control of machine tools and the like is disclosed in Fig. 3.

The primary function of a control station is to apply a control voltage at a value corresponding to the function which it is desired to perform. For purposes of explanation Fig. 4 will be first discussed. This figure shows a simplified means of applying a selected voltage between the grid and the cathode of an input tube, for example tube $T_1$. Switches $S_6$, $S_7$, $S_8$, $S_9$ and $S_{10}$ may be closed to provide a voltage at the output terminals depending upon the number of batteries $B_3$ through $B_{10}$ which are in the circuit. Although not shown it is necessary to provide an "off" position for switches $S_6$, $S_7$ and $S_8$. Resistors $R_{34}$, $R_{35}$, $R_{36}$ and $R_{37}$ are of a comparatively high value with respect to the internal resistance of the batteries used and prevent the short-circuiting of one or more of the batteries upon simultaneous closure of two of the control switches.

Figure 3:
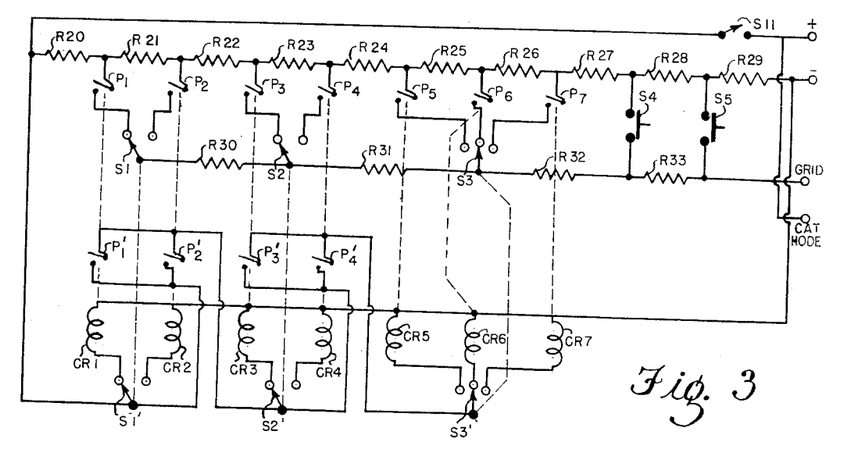
Fig. 3 discloses a circuit arrangement of a control station suitable for operating the control device set forth in Fig. 2.
Figure 4:
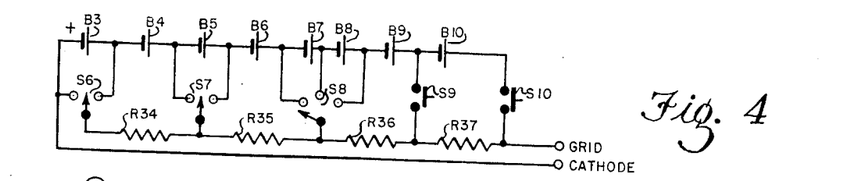
Fig. 4 is a simplified control station utilizing a self-contained power supply.

While the use of the circuit of Fig. 4 satisfies certain basic requirements of a control station, it does not, however, provide automatic sequential application of selected voltages to the control line. The preferred embodiment shown in Fig. 3 includes electromagnetic interlocked switches to accomplish such operation resulting in certain novel advantages when used with a circuit of the type shown in Fig. 2. In Fig. 3 the voltage source consists of a tapped voltage divider having sections $R_{20}$ through $R_{29}$. Characters $R_{30}$ through $R_{33}$ designate protective resistors to prevent loading of the voltage divider upon concurrent closure of two switches. The taps on the voltage divider corresponding to the voltages to be applied to the line are selected by means of selector switches $S_1$, $S_2$ and $S_3$. Switch $S_1$ may for example determine, in the case of a machine tool application, whether rotation of the controlled member shall be to the right or to the left. Switch $S_2$ may be used to determine whether a clamp shall be "on" or "off." Switch $S_3$ may be used to determine whether a movable member shall be in the "feed," "neutral" or "rapid traverse" position. Because of the intermittent operation required for "run" and "inch" controls, push buttons $S_4$ and $S_5$ are provided in cases of the latter functions.

Mechanically coupled with switches $S_1$, $S_2$ and $S_3$ respectively are switches $S_1'$, $S_2'$ and $S_3'$ selecting the control relay winding which it is desired to energize. The control relays are designated $CR_1$ through $CR_7$. Normally open contacts $P_1$ and $P_1'$ are operated by controlled relay $CR_1$, as indicated by the broken lines in Fig. 3. In like manner contacts $P_2$ and $P_2'$ are operated by relay $CR_2$, $P_3$ and $P_3'$ by relay $CR_3$, and $P_4$ and $P_4'$ by relay $CR_4$. Normally open contacts $P_5$, $P_6$ and $P_7$ are respectively operated by the relay windings of relays $CR_5$, $CR_6$ and $CR_7$.

The control station in its preferred embodiment is normally deenergized while the functions are "set up" or prearranged on the control station panel. A switch $S_{11}$ is used to apply voltage to the voltage divider and electromagnetic relays to initiate application of voltage impulses to the line. Assuming that the switch $S_{11}$ has been closed with the selector switches $S_1$, $S_2$ and $S_3$ in the positions shown, it will be seen that relay $CR_1$ will first be energized closing the contacts $P_1$ and $P_1'$. The former results in applying to the line a voltage existing between voltage divider sections $R_{20}$ and $R_{21}$, while closure of the contact $P_1'$ is effective to apply voltage to the relay winding $CR_3$. Closure of relay $CR_3$ will cause closure of contacts $P_3$ and $P_3'$ respectively applying a lower voltage to the line and making possible the subsequent operation of relay $CR_6$. At this point it will be noted that resistor sections $R_{21}$ and $R_{22}$ are shorted by resistor $R_{30}$; however, since the resistance of $R_{30}$ is high compared to the resistance of the voltage divider sections, the circulating current will be at a very low value and substantially no change will be produced on the taps of the voltage divider. In spite of the fact that the time lag in electromagnetic may be very small each voltage is on the control line for sufficient time to cause operation of the load and control tubes. The succession of impulses may occur much more rapidly using gaseous load tubes than if electromagnetic means were used to control a given load directly.

It will be seen from the above that once the control station panel has been "set up" it is merely necessary to close one switch, namely switch $S_{11}$, in order to cause an automatic sequence of predetermined operations to occur. It will also be seen that the use of the capacitors $C_1$, $C_2$, $C_3$ and $C_4$ prevents alternative functions from occurring simultaneously. If the control line is long and has sufficient inductance to cause a sloping wave front, there may be a tendency for the tube $T_{21}$ to fire even though tube $T_{22}$ may have been the one selected. If this occurs, energization of the tube $T_{22}$ will automatically extinguish the tube $T_{21}$ through the action of the capacitor, as described in the discussion above. Further, if it is desired to change from the "neutral" to the "rapid traverse" position of switch $S_3$, it is merely necessary to move the switch to the "rapid traverse" position which will cause firing of tube $T_{27}$ and subsequent extinguishing of tube $T_{26}$ through the action of capacitor $C_4$.

While the control station has been described as having a voltage divider resistor, if desired the resistors $R_{20}$ through $R_{29}$ may be replaced by batteries having the proper voltage to provide the desired voltage increments. This would have the advantage that no power supplying leads would be required in the control cable.

Although the control station as disclosed in Fig. 3 is effective to provide voltages ranging from the negative value to a near zero value to the grid of the input tube $T_1$, it will be obvious to one skilled in the art that the output leads may be reversed to provide voltages ranging from positive values to near zero and, if desired, the output voltage may be caused to vary both negatively and positively by providing a point of zero potential in the intermediate portion of the voltage divider. In this way input tubes having a wide variety of dynamic characteristics may be utilized.

Figure 5:
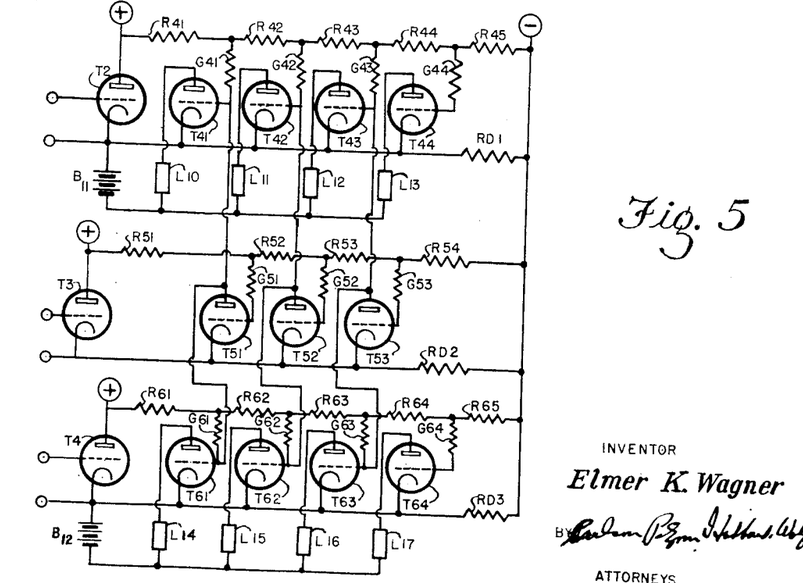
Fig. 5 is an alternative form of the circuit in which one bank of control tubes is effective alternatively to control two banks of load tubes.

In Fig. 5 a further embodiment of my invention is disclosed to illustrate the flexibility of a control system constructed in accordance with my teachings. Two banks of load tubes are provided, the first bank consisting of tubes $T_{41}$ through $T_{44}$ and the second bank consisting of tubes $T_{61}$ through $T_{64}$. Four load tubes per bank are shown although it will be obvious that more or less than this number could be used. Positive voltages are applied to the grids of the first bank of tubes through the taps intermediate resistors $R_{41}$ through $R_{45}$, while in the case of the second bank of load tubes positive voltages are supplied by resistors $R_{61}$ through $R_{65}$. Loads $L_{10}$ through $L_{17}$ are connected in the plate circuits of the load tubes. In the case of the first bank of tubes the cathode voltage varies in accordance with the voltage drop through resistor $RD_1$ and is controlled by input tube $T_2$, while in the second bank this is accomplished by resistor $RD_3$ and input tube $T_4$.

Control tubes $T_{51}$, $T_{52}$ and $T_{53}$ have plates respectively connected to the grids of the first, second and third load tubes in each bank, current being supplied to the plates preferably equally by grid resistors $G_{41}$ and $G_{61}$, $G_{42}$ and $G_{62}$, and $G_{43}$ and $G_{63}$. In order to simplify the diagram, no power source for the voltage divider has been shown and it will be assumed that a source is connected to the plus and minus power terminals shown. Power for the load tubes is supplied from power sources $B_{11}$ and $B_{12}$.

No control station for operating this embodiment is shown; however, it will be obvious that a control station constructed in accordance with the teachings outlined in the discussion of Fig. 3 could readily be constructed. In order to control the load in the first bank it is possible merely to parallel the input leads and input tubes $T_2$ and $T_3$ and to apply to $T_4$ a voltage sufficient to cause load tubes $T_{61}$ through $T_{64}$ to be cut off in spite of current flow through grid resistors $G_{61}$, $G_{62}$ and $G_{63}$. As in the embodiment previously discussed, it is necessary that a control tube be biased more negatively than its associated load tube and the resistance of the dropping resistors $RD_1$ and $RD_2$ and the characteristics of the input tubes $T_2$ and $T_3$ may readily be so chosen that this condition obtains.

Instead of paralleling the input leads to a bank of load tubes and a bank of control tubes it is possible, and in some applications will be desirable, to supply voltage from separate sources. Also, if desired, provision may be made for cutting off the plate current supplied to the plates of the nonselected load tubes rather than reducing current through them to zero by application of a highly negative grid bias as suggested above.

In Fig. 5, for purposes of ready understanding, separate tapped resistors are shown for supplying the grid potentials of the several banks of tubes.

However, it is seen in Figs. 1 and 2 that the resistor supplying the grids of the load tubes is connected in series with the resistor supplying the grids of the control tubes. If desired the latter scheme may be followed here. As one alternative it will be readily seen from the foregoing discussion of Fig. 2 that the tapped resistors supplying the load tubes could be paralleled and then put in series with the resistor supplying the control tubes. If it is desired to control the load and control tubes from the same potential source, a glow tube could be inserted in such circuit in exactly the manner taught in connection with Fig. 2.

As an alternative use of the circuits disclosed in Figs. 1, 2 and 5, it is possible to energize two adjacent loads simultaneously. This may be done by increasing the bias differential between a bank of load tubes and a bank of control tubes to an amount in excess of the voltage increments existing between the grid taps of the voltage dividing resistors. In the case of Fig. 2, simultaneous operation of two load tubes may be accomplished by increasing the resistance of resistor $R_{10}$, or alternatively by reducing the voltage rating of the glow tube to somewhat below the value of 100 volts which was previously chosen for purposes of discussion. By a further increase in resistance $R_{10}$, assuming of course that the voltage across the divider is raised to preserve the value of the voltage increments between taps, three adjacent load tubes or more can be caused to be simultaneously conductive.

While the invention has been described in the specification and drawings with particular reference to its application as a control for functions associated with a machine tool or the like, it will appear to one skilled in the art that the above teachings may be used advantageously in other ways, for example, in the measurement of voltages. In the latter case the loads may consist of a series of lamps or other indicating devices and the voltage to be tested applied to the input terminals thereby setting the bias on the load and control tubes. An input voltage falling in a certain range will be indicated by the operation of a predetermined lamp or indicating device.

While the use of input tubes has been found desirable for the reasons stated, it will appear to one skilled in the art that the input tubes may be dispensed with and the control voltage applied directly across the leads now shown to be connected to the plate and cathode terminals of the input tubes without sacrificing all of the advantages of the improved system which I disclose. The control voltages will necessarily be of a higher order of magnitude than if such voltages were applied to the grid of the input tubes.

I claim as my invention:

1. An electronic control device comprising: a plurality of load tubes each having a grid, a plate and a cathode; a plurality of loads in series with the circuits of said plates respectively; a first tapped bias source having voltage increments between taps, said grids being respectively associated with the taps of said bias source; grid resistors respectively connected between said grids and said taps; a plurality of control tubes each having a grid, a plate and a cathode respectively, the plates of said control tubes respectively connected to the grids of said load tubes and arranged to draw plate current through said grid resistors respectively, a second tapped bias source having taps respectively connected to the grids of said control tubes, said second tapped bias source producing a lower average positive voltage than said first tapped bias source, the cathodes of said load tubes being connected to a first common conductor and the cathodes of said control tubes being connected to a second common conductor; a gaseous discharge device of the type producing a constant voltage drop connected between said first common conductor and said second common conductor; and means for simultaneously varying the potential on said cathodes to cause successive energization of said loads.

2. An electronic control device comprising: a plurality of load tubes each having a grid, a plate, and a cathode; a plurality of loads energized by the flow of plate current in said load tubes respectively; a tapped resistor voltage source having voltage increments between taps, the grids of said load tubes respectively connected to said taps; grid resistors connected between said grids and said taps respectively; a plurality of control tubes respectively associated with said load tubes and having grids, plates and cathodes respectively, the plates of said control tubes respectively connected to the grids of said load tubes; a second tapped resistor voltage source having voltage increments between taps, the grids of said load tubes respectively connected to said taps of said second resistor to produce a normal bias on said control tubes respectively which is a fixed amount more negative than the bias on the associated load tubes respectively; an additional biasing means for simultaneously applying a variable bias on said load and control tubes to cause successive energization of said loads.

3. A device for selectively energizing one of a plurality of loads comprising: a series of load tubes each having a grid, a plate, and a cathode; loads respectively associated with the plate circuits of said tubes; a first biasing means to apply bias to said load tubes in graduated steps respectively, said bias adjustable to cause substantially no current to flow in said load tubes; a series of control tubes each having an anode, a grid and a cathode, the anodes of said control tubes connected respectively with the grids of said load tubes and effective to stop conduction in said load tubes upon flow of current in the associated control tube; a second biasing means to apply grid bias to said control tubes in graduated steps, said bias being adjustable to prevent flow of plate current in said control tubes; a variable bias source effective to superimpose additional bias on said load tubes and said control tubes whereby an increase of positive bias from said variable bias source said loads may be successively energized and deenergized, the grid bias produced by said first and second bias sources being of such magnitude that only one load may be energized at a time.

4. An electronic control device comprising: a load discharge device having a grid, a plate, and a cathode; an electrical load in series with said plate; means including a first grid bias source for applying a bias voltage between said grid and said cathode and adjustable to a value which causes conduction of plate current in said load discharge device; a control discharge device having a grid, a plate, and a cathode, said plate being connected to the grid of said load discharge device and effective to apply negative voltage thereto upon flow of current in the plate circuit of said control discharge device; and means for controllably applying a bias voltage to the grid of said control discharge device which is of such magnitude that the resulting plate current flow therein causes cutoff so said load discharge device in spite of the fact that the bias source for the latter may be adjusted for conduction.

5. A device for electronically controlling the energization of a load comprising: a load discharge device having a grid, a plate, and a cathode; a load arranged to be energized by the flow of plate current therein; a first biasing means associated with said discharge device arranged to render said discharge device normally nonconducting; a control discharge device having a grid, an anode and a cathode, said anode associated with the grid of said load discharge device and arranged to increase negative bias thereon upon flow of anode current; a second biasing means associated with said control discharge device and of such a value as to cause said control discharge device to be normally nonconducting; a source of variable bias acting simultaneously on both of said discharge devices, said first and second biasing means so adjusted that upon a decrease in the magnitude of negative bias supplied by said variable bias source said load discharge device will become conductive before said control discharge device.

6. An electronic control device comprising: a load tube having a grid, a plate, and a cathode; a load in the circuit of said plate; said grid connected to a source of positive potential; a grid resistor in said grid circuit; means for supplying a positive potential to said cathode of sufficient magnitude to cause said tube to be normally non-conducting in spite of the positive potential existing on said grid; a control tube having a grid, an anode, and a cathode, said anode connected to the grid of said load tube and arranged to draw current through said grid resistor; means for supplying a positive potential to the cathode of said control tube of such a value as to normally cause said control tube to be nonconducting; a variable source of bias acting on both tubes simultaneously whereby an increase of positive bias from said variable source may successively cause conduction and nonconduction in said load tube.

7. An electronic control circuit comprising: a series of load tubes each having a grid, a plate, and a cathode; loads respectively associated with said plates and arranged to be energized therefrom; a stepped bias source to apply graduated bias to said load tubes normally effective to prevent plate current flow therein; a series of control tubes each having an anode, a grid, and a cathode, the anodes of said control tubes associated with the grids of said load tubes to control the conduction in said load tubes; a stepped bias source to apply a graduated bias to said control tubes respectively; a variable bias source controlling the bias on said load tubes and said control tubes whereby an increase in positive bias from said variable bias source may cause said loads to be successively energized and deenergized.

8. A device for selectively energizing one of a plurality of loads comprising: a series of load tubes each having a grid, a plate, and a cathode; loads respectively associated with the plate circuits of said tubes; a first biasing means to apply bias to said load tubes in graduated steps respectively, said bias effective to cause substantially no current to flow in said load tubes; a series of control tubes each having an anode, a grid and a cathode, the anodes of said control tubes connected with the grids of said load tubes and the current flow in said anodes effective to stop conduction in said load tubes; a second bias source to apply grid bias to said control tubes in graduated steps, said bias being of a value to normally prevent flow of plate current in said control tubes; a variable bias source effective to superimpose additional bias on said load tubes and said control tubes whereby by an increase of positive bias from said variable bias source said loads may be successively energized and deenergized.

9. An electronic control device comprising: a plurality of load tubes each having a grid, a plate, and a cathode; a plurality of loads respectively connected in the plate circuits of said load tubes; a tapped voltage source having voltage increments between taps, the grids of said load tubes respectively associated with said taps; grid resistors in series with said grids respectively; a plurality of control tubes respectively associated with said load tubes and each having a grid, a plate, and a cathode, said control tube plates respectively connected to the grids of said load tubes, said control tube grids respectively connected to a voltage source producing a control tube bias respectively more negative than the bias of the associated load tube; and means for simultaneously varying the bias on said load and control tubes to cause successive energization of said loads.

10. An electronic control device comprising: a plurality of load tubes each having a grid, a plate, and a cathode; a plurality of loads energized by the flow of plate current in said load tubes respectively; a tapped resistor voltage source having voltage increments between taps, the grids of said load tubes respectively connected to a relatively more positive portion of said taps; grid resistors connected between said grids and said taps respectively; a plurality of control tubes respectively associated with said load tubes and having grids, plates and cathodes respectively, the plates of said control tubes respectively connected to the grids of said load tubes; the grids of said load tubes respectively connected to a relatively more negative portion of said resistor taps to produce a normal bias on said control tubes respectively which is a fixed amount more negative than the bias on the associated load tubes respectively; an additional biasing means for simultaneously applying a variable bias on said load and control tubes to cause successive energization of said loads.

11. In an electronic control device of a type wherein a plurality of loads are successively energized in predetermined rotation upon application of a plurality of voltage impulses of predetermined magnitude to the input circuit, the combination of a control station comprising a voltage source having taps, a plurality of tap switches contacting adjacent groups of taps and connected to a common line, resistances included in said line between said tap switches, said resistances having a sufficiently high resistance to cause any change in voltage of said taps caused by concurrent connection of said input circuit to more than one of said taps to be of negligible value.

12. An electronic control device comprising: a plurality of load tubes each having a grid, a plate and a cathode; a plurality of loads energized by the flow of current in said plates; a tapped positive voltage source having voltage increments between taps, the grids of said load tubes respectively connected to said taps; grid resistors respectively inserted between said grids and said taps; a plurality of control tubes each having a grid, a plate and a cathode, the plates of said control tubes respectively connected to the grids of said load tubes; a second tapped voltage source having voltage increments between taps, the grids of said control tubes respectively connected to said taps; the cathodes of said load tubes having a common terminal and the cathodes of said control tubes having a common terminal; means for producing a voltage difference between said terminals; and means superimposing a variable bias on said load and control tubes simultaneously to cause successive energization of said loads.

13. An electronic control device comprising: a plurality of load tubes each having a grid, a plate and a cathode; a plurality of loads energized by the flow of current in said plates; a tapped voltage source having voltage increments between taps, the grids of said load tubes respectively connected to said taps; grid resistors respectively inserted between said grids and said taps; a plurality of control tubes each having a grid, a plate and a cathode, the plate of said control tubes respectively connected to the grids of said load tubes; a second tapped voltage source having voltage increments between taps, the grids of said control tubes respectively connected to said taps; the cathodes of said load tubes having a common terminal and the cathodes of said control tubes having a common terminal; gaseous discharge means for producing a fixed voltage difference between said terminals; and means superimposing a variable bias on said load and control tubes to cause successive energization of said loads.

14. An electronic control device comprising: a plurality of load tubes each having a grid, a plate and a cathode; a plurality of loads respectively connected in the circuits of said plates; first tapped resistor for supplying incremental positive voltages to said grids; grid resistors respectively connected between said grids and the taps of said first tapped resistor; a plurality of control tubes each having a grid, a plate and a cathode, the plates of said control tubes being respectively connected to the grids of said load tubes and arranged to draw current through said grid resistors respectively; a second tapped resistor, the grids of said control tubes being respectively connected to the taps of said second resistor, the voltage between given taps of said first tapped resistor being equal to the voltage between corresponding taps on said second tapped resistor; and means for superimposing a variable bias on said load tubes and control tubes to cause successive energization of said loads in a predetermined order.

15. An electronic control device for the consecutive energizing of a plurality of loads comprising: a plurality of load tubes each having a grid, a plate and a cathode; a tapped resistor voltage source having fixed voltage increments between taps, the grids of said load tubes connected to the taps in the high positive voltage region of said tapped resistor; grid resistors respectively in series with said grids and said taps; a plurality of control tubes each having a grid, a plate and a cathode, the plates of said control tubes being respectively connected to the grids of said load tubes, the grids of said control tubes being respectively connected to taps on said tapped resistor in the region of low positive voltage, the cathodes of said load tubes being respectively interconnected and the cathodes of said control tubes being respectively interconnected; constant voltage dropping means between said groups of interconnected cathodes; adjustable biasing means for simultaneously making more negative the cathodes of said tubes, said constant voltage dropping means causing such a potential difference between said grouped cathodes that said loads may be selectively energized by adjustment of the adjustable biasing means.

16. In an electronic control device of a type requiring a succession of voltage impulses of predetermined voltage on a line to energize predetermined loads, a tapped source of voltage, means for preselecting taps corresponding to predetermined voltages, and means including a plurality of electromagnetic switches for sequentially connecting the preselected taps to said line.

17. In an electronic control device of a type in which the application of a series of voltages of predetermined magnitudes to a line causes successive energization of a plurality of loads, a tapped source of voltage, switching means for selecting taps on said source of voltage corresponding to the loads which it is desired to energize, and electromagnetic switching means having interlocked contacts so arranged that said voltages are applied to said line in order of decreasing magnitude of voltage.

18. In an electronic switching device for the consecutive energization of a plurality of loads in response to the magnitude of the voltage existing at the output of a control station, said control station comprising a voltage source, a current-carrying resistor, taps on said resistor, selector switch means whereby the voltage existing between one end of the resistor and a selected tap may be applied to the output of said station, a plurality of electromagnetic contactors having contacts effective to apply the voltage of selected taps to said output, normally open interlocking contacts in series with said electromagnetic contactors for determining the sequence of application of said tap voltages to said output, and switching means for applying voltage from said source to said current-carrying resistor and said electromagnetic contactors to initiate the successive application of said selected tap voltages to said line.

19. An electronic control device for consecutively energizing a plurality of loads comprising, in combination, a plurality of load tubes arranged to become successively conducting when subject to a change of biasing voltage, a plurality of loads energized by the current flowing through said tubes, control station means for varying the bias on said tubes to provide voltage impulses of predetermined magnitude causing consecutive energization of said loads, said tubes being of the gaseous conduction type wherein conduction is maintained even after the removal of an initiating control signal produced by said control station.

20. An electronic control device for the alternative energization of a plurality of loads comprising gaseous load tubes each having a grid, a plate and a cathode, a plurality of loads respectively connected to said tubes and energized by the flow of plate current therein, control station means for selectively controlling energization of said tubes by variation of the bias on said tubes, capacitors interconnecting the plate terminals of said tubes whereby the initiating of conduction in a selected tube by application of the proper biasing is effective to stop conduction in the remainder of said tubes.

21. In an electronic device for the selective energization of a plurality of loads, a first bank of load tubes each having a grid, a plate and a cathode, a second bank of load tubes each having a grid, a plate and a cathode, a plurality of loads respectively energized by plate current flow in said tubes, control station means for varying the bias on said banks of load tubes to accomplish selective energization of said loads, a bank of control tubes for selectively deenergizing said loads, and input means enabling said control tubes to be operated in combination with a selected bank of load tubes.

22. In an electronic control arranged for the selective energization of a plurality of loads comprising: load tubes each having a plate, a grid and a cathode; loads respectively associated with said plates; biasing means causing successive energization of said load tubes, said biasing means including an input tube having a plate, a grid and a cathode; a resistor subject to the current flowing through said input tube, the voltage drop through said resistor determining the bias on said tubes; and means for controlling the voltage applied to the grid of said input tube.

23. An electronic control device comprising load tubes each having a grid, a plate and a cathode; loads energized by said load tubes and associated with the plates thereof; grid resistors in series with said grids; control tubes each having a grid, a plate and a cathode; the plates of said control tubes respectively connected to the grids of said load tubes and arranged to draw current through said grid resistors to increase the negative bias of said load tubes to cut-off; a voltage divider having taps, the grids of said load tubes and said control tubes connected to said taps; voltage dropping means in the circuit of said cathodes whereby the grid of each load tube is biased less negatively than the grid of the associated control tube by an amount substantially equal to or exceeding the variation in bias required to cause the plate current of said load tube to vary from a substantially nonconducting condition to a load-energizing condition.

24. An electronic control device for the exclusive energization of one of a series of loads comprising a series of load tubes each having a grid, a plate and a cathode; a plurality of loads respectively connected to the plates of said load tubes; first voltage divider means for supplying tapped positive potentials to the grids of said load tubes respectively; grid resistors inserted between said grids and said voltage divider; control tubes each having a grid, a plate and a cathode, the plates of said control tubes drawing current through said grid resistors sufficient to bias said load tubes to cut-off; a second tapped voltage divider producing a lower average positive voltage than said first voltage divider, the grids of said control tubes connected to the taps of said second voltage divider; and compensating means in the circuit of said cathodes arranged so that each load tube is biased less negatively than the associated control tube by an amount substantially equal to or exceeding the variation in bias required to cause the plate current of said load tube to vary from the nonconducting to the load-energizing condition, the voltage difference between the taps of said first and second voltage dividers being equal and having a magnitude substantially equal to or greater than the difference in bias between an associated load tube and control tube.

ELMER K. WAGNER.

REFERENCES CITED

The following references are of record in the file of this patent:

UNITED STATES PATENTS

| Number | Name | Date |
| --- | --- | --- |
| 1,781,792 | Rodman | Nov. 18, 1930 |
| 1,801,657 | Buyko | Apr. 21, 1931 |
| 1,921,788 | Suits | Aug. 8, 1933 |